(12) United States Patent
Bourret

(10) Patent No.: US 6,488,553 B2
(45) Date of Patent: Dec. 3, 2002

(54) DRIVESHAFT WITH A RESILIENTLY DEFORMABLE CUSHIONING STRUCTURE SECURED THEREON

(75) Inventor: Robert Bourret, NE Palm Bay, FL (US)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 09/886,272

(22) Filed: Jun. 22, 2001

(65) Prior Publication Data

US 2002/0002018 A1 Jan. 3, 2002

Related U.S. Application Data

(60) Provisional application No. 60/213,241, filed on Jun. 22, 2000.

(51) Int. Cl.[7] .............................. B63H 23/34; F16C 3/00
(52) U.S. Cl. .............................. 440/83; 440/38; 464/180
(58) Field of Search ............................ 464/180; 440/38, 440/83

(56) References Cited

U.S. PATENT DOCUMENTS

| | | | |
|---|---|---|---|
| 4,722,707 A | * | 2/1988 | Murase ........................ 440/112 |
| 4,813,898 A | | 3/1989 | Nakase et al. |
| 4,913,671 A | * | 4/1990 | Gavriles et al. ............... 403/37 |
| 4,938,723 A | * | 7/1990 | Yoshimura et al. ............ 440/52 |
| 5,366,399 A | * | 11/1994 | Reid et al. ..................... 440/83 |
| 5,372,526 A | * | 12/1994 | Ozawa et al. .................. 440/38 |
| 6,354,988 B1 | * | 3/2002 | Carson et al. ............... 464/180 |

OTHER PUBLICATIONS

Bombardier "Sea–Doo," Parts Catalog XP 5651/5655, 2000, pp. A1–A2 and C6–C10.
Bombardier "Sea–Doo," Parts Catalog 1968–1969, p. 1, p.1.1 to 1.9.
Bombardier "Sea–Doo," General Information/Parts Catalog, 1968, p.1.1 and p.1.2.

* cited by examiner

*Primary Examiner*—Sherman Basinger
(74) *Attorney, Agent, or Firm*—Pillsbury Winthrop LLP

(57) ABSTRACT

A watercraft includes an engine having an output shaft. A coupling structure is provided on one end of the output shaft. A driveshaft has an engine connecting axial end portion. The engine connecting end portion provides a first cooperating interlocking structure. A resiliently deformable cushioning structure has a second cooperating interlocking structure and is mounted to the engine connecting end portion with the first and second interlocking structures interlocking with one another to secure the cushioning structure on the engine connecting end portion. The coupling structure couples the output shaft and driveshaft together so that powered rotation of the output shaft is transmitted to the driveshaft. The cushioning structure is positioned between the engine connecting end portion and output shaft such that the cushioning structure prevents the engine connecting end portion from abutting directly against the output shaft during relative movement of the driveshaft and output shaft towards one another.

36 Claims, 10 Drawing Sheets

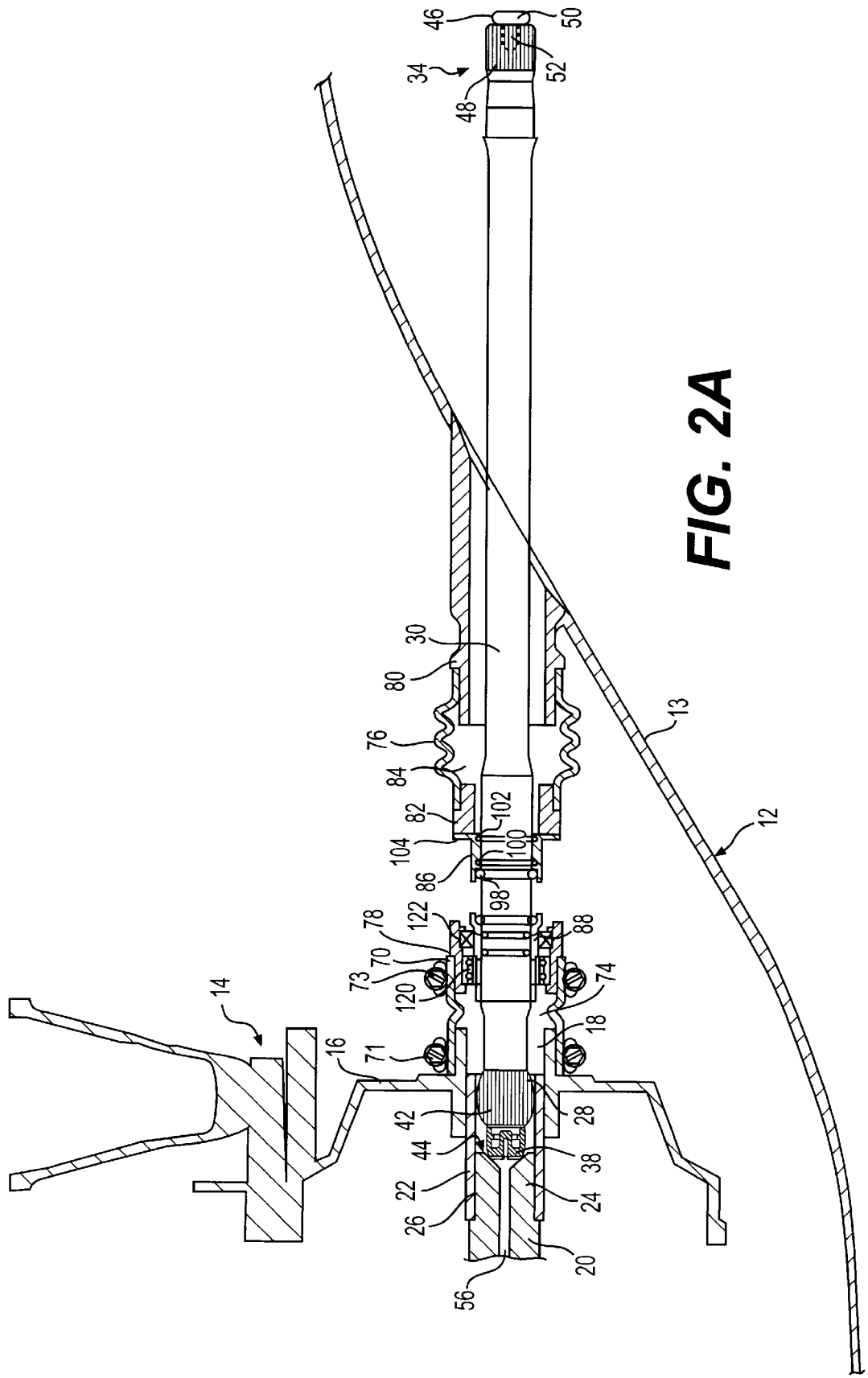

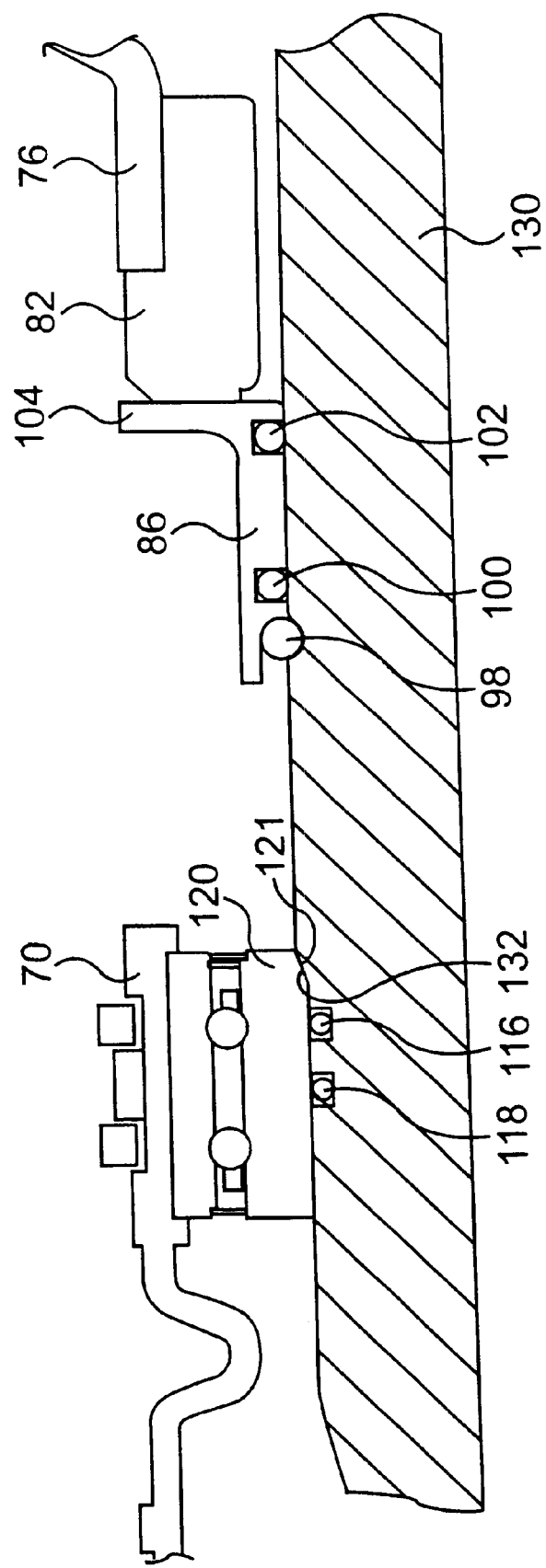

DRIVESHAFT WITH A RESILIENTLY DEFORMABLE CUSHIONING STRUCTURE SECURED THEREON

This application claims priority to U.S. Provisional Patent Application Ser. No. 60/213,241 filed on Jun. 22, 2000, which is hereby incorporated by reference in full.

FIELD OF THE INVENTION

The present invention relates to a watercraft for travelling along a surface of a body of water. The watercraft may be jet-propelled watercraft such as personal watercraft or inboard or outboard powered boats.

BACKGROUND OF THE INVENTION

Watercraft of the type herein contemplated comprise a hull for buoyantly supporting the watercraft on the surface of a body of water and an engine carried by the hull therein. A driveshaft is coupled with an output shaft of the engine to rotate a propelling structure connected to an axial end portion of the driveshaft so as to propel the watercraft along-the surface of the body of water.

The engines of these watercraft are usually mounted on shock absorbing mounts that incorporate resiliently deformable material for dampening the transmission of vibrations from the engine to the hull. The resiliently deformable material of these mounts allows the engine to move slightly with respect to the hull. When the driveshaft and output shaft are coupled within the engine's coupling structure, the relative motion of the engine will cause the output shaft to abut against the end of the driveshaft which creates a hammering effect that can damage the engine as well as other components of the watercraft, such as the propelling structure.

To minimize this hammering effect, a rubber endcap has been placed on an axial end portion of the driveshaft close to the engine to cushion the abutment with the output shaft. However, the endcap is placed on the driveshaft with a friction-type fit which is not particularly secure and may fall off the driveshaft. This arrangement has been found to be suitable for engines wherein the coupling structure is external to the engine's outer casing because it is easier for the installing technician to visually verify the placement of the endcap as the driveshaft is inserted into the coupling structure. However, such an arrangement is not well-suited for an arrangement wherein the coupling structure is internal to the engine's casing. The driveshaft with the rubber endcap is placed blindly therein and it is more difficult for the technician to visually verify that the endcap is properly positioned as it is being inserted into the coupling structure via the opening in the engine's outer casing. Thus, it is more likely that the endcap may be knocked off or oriented improperly during installation.

Accordingly, there is a need for an endcap which is fixedly secured on the end of the driveshaft so a proper placement within the coupling structure is guaranteed, regardless of a visual confirmation. This will ensure that the engine and associated components will not be damaged if abutment between the driveshaft and the coupled output shaft occurs.

Further, because known endcaps are not securely and captively placed on the driveshaft, endcaps are likely to fall off the driveshaft during handling and transport within the manufacturing plant. Accordingly, there is a need for an endcap which is fixedly secured on the end of the driveshaft so that the endcap is less likely to fall off and become displaced.

SUMMARY OF THE INVENTION

It is an object of the present invention to couple the driveshaft and output shaft together while meeting the above-described needs.

In accordance with one aspect of the present invention, this objective is achieved by providing a watercraft for travelling along a surface of a body of water. The watercraft comprises a hull for buoyantly supporting the watercraft on the surface of the body of water. An engine is carried by the hull and comprises an outer casing, a rotatable output shaft, and a coupling structure provided on one end of the output shaft for rotation therewith. The coupling structure has a driveshaft receiving bore.

A driveshaft has an engine connecting axial end portion and a propelling structure connecting axial end portion. The engine connecting end portion provides a first cooperating interlocking structure. A resiliently deformable cushioning structure has a second cooperating interlocking structure and is mounted to the engine connecting axial end portion of the driveshaft with the first and second cooperating interlocking structures interlocking with one another in a cooperating relationship to secure the cushioning structure on the engine connecting axial end portion.

The engine connecting axial end portion of the driveshaft with the cushioning structure secured thereon is inserted into the driveshaft receiving bore of the coupling structure. The coupling structure couples the output shaft and the drive shaft together so that powered rotation of the output shaft rotates the driveshaft via the coupling structure. The cushioning structure is positioned between the engine connecting axial end portion and abuttable structure within the driveshaft receiving bore such that the cushioning structure prevents the engine connecting axial end portion from abutting directly against the abuttable structure during relative movement of the engine and the driveshaft towards one another.

A propelling structure is operatively connected to the propelling structure axial end portion of the driveshaft such that powered rotation of the output shaft rotates the propelling structure via the driveshaft. The propelling structure is constructed and arranged to displace water during rotation thereof so as to propel the watercraft along the surface of the body of water.

In accordance with another aspect of the present invention, the engine carried by the hull comprises an outer casing having a supply of lubricant contained therein. The output shaft has structure defining a fluid path communicating the supply of lubricant to the driveshaft receiving bore such that during generation of power, the lubricant flows along the fluid path to the driveshaft receiving bore of the coupling structure. The driveshaft has an engine connecting axial end portion and a propelling structure connecting axial end portion. The engine connecting axial end portion has one or more generally radially extending lubricant distributing grooves formed thereon when the cushioning structure is not provided.

In accordance with another aspect of the present invention, the engine connecting axial end portion of the driveshaft is inserted into the driveshaft receiving bore of the coupling structure such that the coupling structure couples the output shaft and the driveshaft together so that powered rotation of the output shaft rotates the driveshaft via the coupling structure. The one or more generally radially extending lubricant distributing grooves are positioned in communication with the fluid path so that the lubricant flowing into the driveshaft receiving space flows into the one or more lubricant distributing grooves. Each of the one or more lubricant distributing grooves is configured to distribute the lubricant radially within the driveshaft receiving bore by centrifugal force during the rotation of the driveshaft and the output shaft.

In accordance with another aspect of the present invention, the objective is achieved by providing a driveshaft assembly for use in a vehicle having an engine with an output shaft. The driveshaft assembly comprises a driveshaft having an engine connecting axial end portion. The engine connecting end portion provides a first cooperating interlocking structure. A resiliently deformable cushioning structure having a second cooperating interlocking structure is mounted to the engine connecting axial end portion of the driveshaft, the first and second cooperating interlocking structures interlocking with one another in a cooperating relationship to secure the cushioning structure on the engine connecting axial end portion. The driveshaft further comprises a propelling structure connecting axial end portion. The propelling structure axial end portion is adapted to be operatively connected to a propelling structure such that powered rotation of the output shaft rotates the propelling structure via the driveshaft.

In accordance with another aspect of the present invention, a driveshaft is provided for use in a vehicle having an engine with an output shaft, the output shaft having structure defining a fluid path communicating a supply of lubricant contained within the engine. The driveshaft comprises an engine connecting axial end portion having one or more generally radially extending lubricant distributing grooves formed thereon. The engine connecting axial end portion of the driveshaft is adapted to be coupled with the output shaft so that powered rotation of the output shaft is transmitted to the driveshaft and the one or more generally radially extending lubricant distributing grooves are positioned in communication with the fluid path so that the lubricant flows into the one or more lubricant distributing grooves. Each of the one or more lubricant distributing grooves is configured to distribute the lubricant radially by centrifugal force during the rotation of the driveshaft and the output shaft. The driveshaft further includes a propelling structure connecting axial end portion. The propelling structure axial end portion is adapted to be operatively connected to a propelling structure such that powered rotation of the output shaft rotates the propelling structure via the driveshaft.

These and other objects, features, and advantages of this invention will become apparent from the following detailed description when taken into conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments this invention. In such drawings:

FIG. 2A is a cross-sectional view of the watercraft showing a driveshaft constructed in accordance with the principles of the present invention coupled the output shaft of the engine;

FIG. 7 is a cross-sectional view showing a bearing and a sealing sleeve mounted to the driveshaft shown in FIG. 6A;

DETAILED DESCRIPTION OF THE INVENTION

Figure 1:
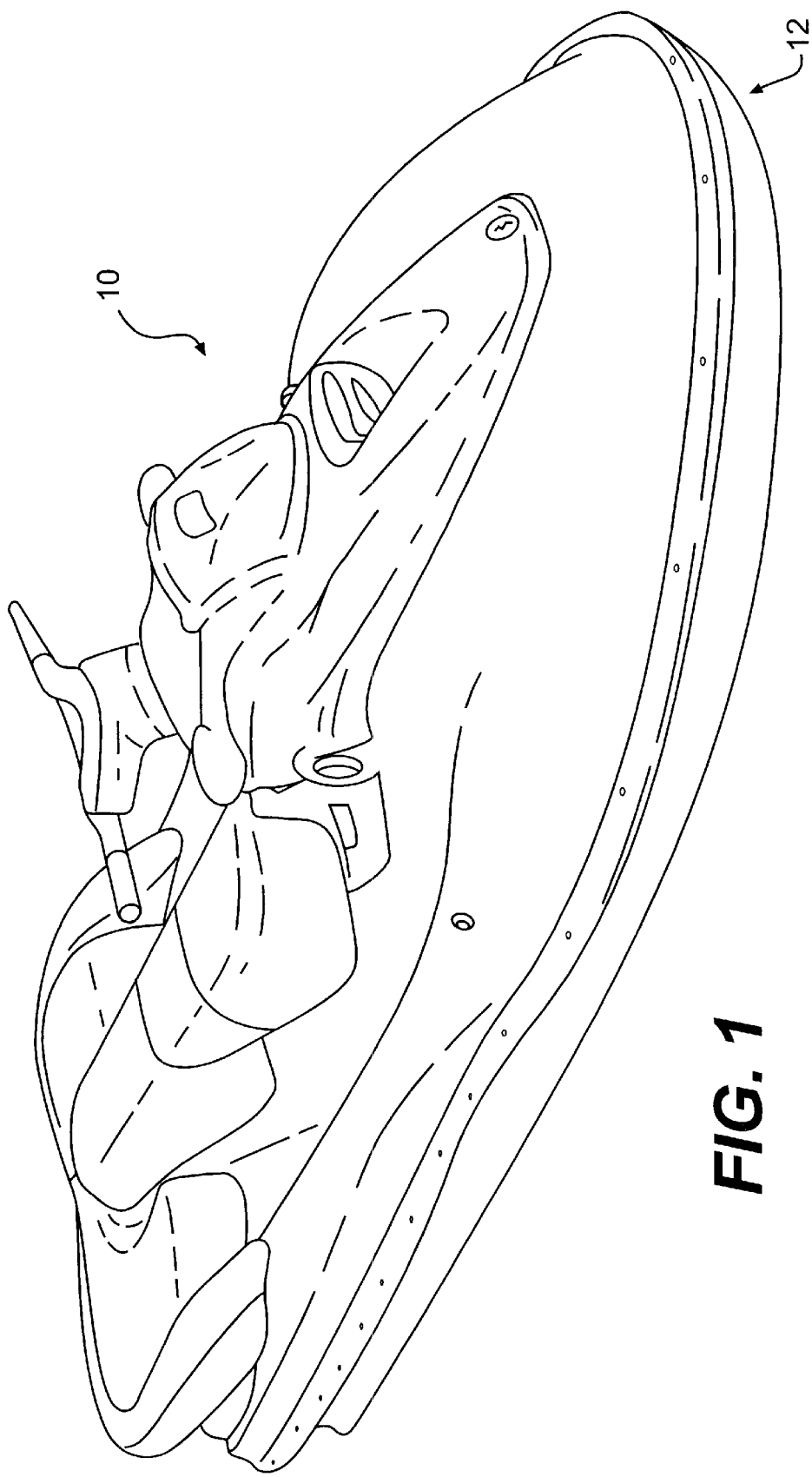
FIG. 1 is a perspective view of a watercraft for traveling along a surface of a body of water.

FIG. 1 shows a watercraft, generally shown at 10, for travelling along a surface of a body of water. The watercraft 10 comprises a hull, generally shown at 12, for buoyantly supporting the watercraft 10 on the surface of the body of water. The hull 12 typically is molded from fiberglass material and lined internally with buoyant foam material.

An engine, generally shown at 14 in FIG. 2A, is carried by the hull 12. The engine 14 comprises an outer casing 16 having a driveshaft receiving opening 18. An output shaft 20 is rotatably mounted within the outer casing 16. A coupling structure 22 is provided on one end 24 of the output shaft 20 for rotation therewith. The coupling structure 22 includes an output shaft receiving bore 26. The output shaft receiving bore 26 has threads thereon to threadably engage a threaded portion of the one end 24 of the output shaft 20 so as to couple the coupling structure 22 with the output shaft 20.

The engine is constructed and arranged to generate power and apply the power to the output shaft 20 as torque to affect rotation of the output shaft 20. Preferably, the engine is an internal combustion engine that includes one or more cylinders and one or more reciprocating pistons received within the cylinders. The pistons are connected to the output shaft 20 to affect rotary motion thereof in well-known manner. The engine may be of the four-stroke or two-stroke type. It is contemplated that the engine may also be an electromagnetic motor having a rotor and a stator, the rotor being connected to the output shaft 20.

Figure 2B:
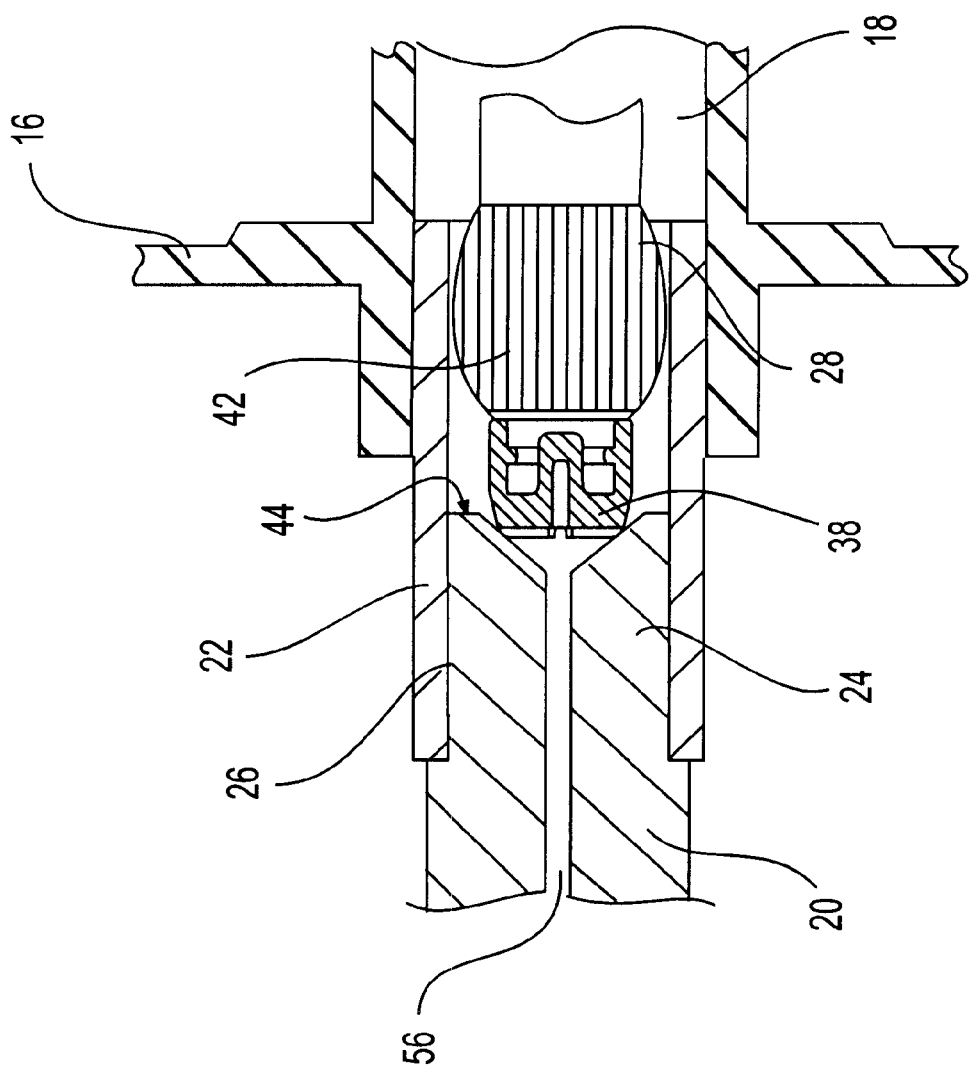
FIG. 2B is an enlarged portion of FIG. 2A showing the driveshaft coupled with the output shaft of the engine.

The coupling structure 22 has a driveshaft receiving bore 28 in coaxial relation with the output shaft receiving bore 26. As illustrated in FIGS. 2A and 2B, the coupling structure 22 is disposed within the casing 16 adjacent the driveshaft receiving opening 18 such that the drive shaft receiving bore 28 is aligned within the casing 16 with the driveshaft receiving opening 18. The coupling structure 22 may be disposed external to the casing 16. However, the coupling structure 22 is preferably disposed within the casing 16 because this arrangement facilitates sealing the supply of lubricant contained within the casing.

Figure 3A:
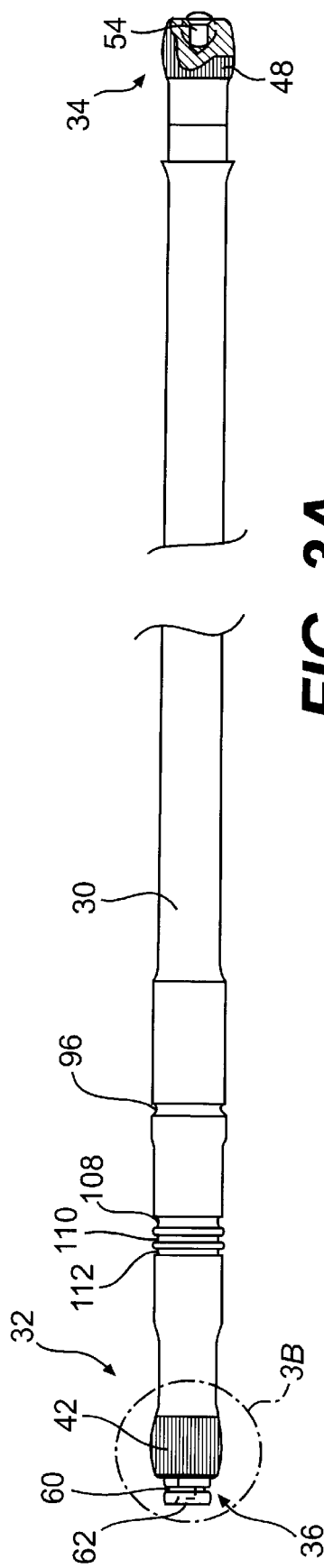
FIG. 3A is a side view of the driveshaft constructed in accordance with the principles of the present invention.

A driveshaft 30 has an engine connecting axial end portion, generally shown at 32 in FIG. 3A, and a propelling structure connecting axial end portion, generally shown at 34. The engine connecting end portion 32 provides a first cooperating interlocking structure, generally shown at 36. The driveshaft 30 may also be referred to as an impeller shaft. The driveshaft 30 may be a unitary body or may be formed by multiple shafts.

Figure 5C:
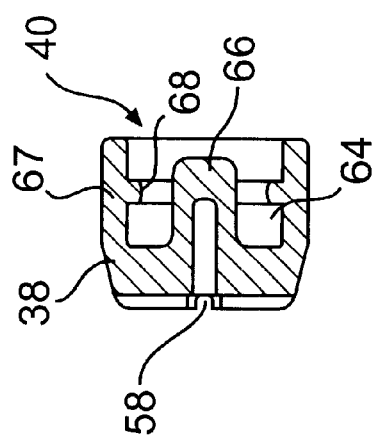
FIG. 5C is a cross-sectional view of the resiliently deformable cushioning structure.
Figure 5B:
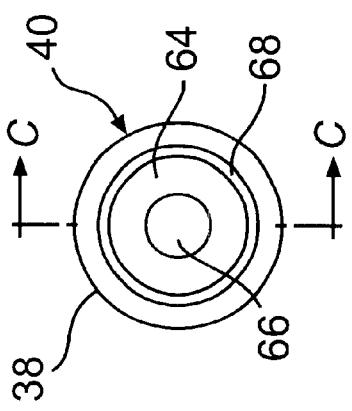
FIG. 5B is a bottom view of the resiliently deformable cushioning structure.
Figure 5A:
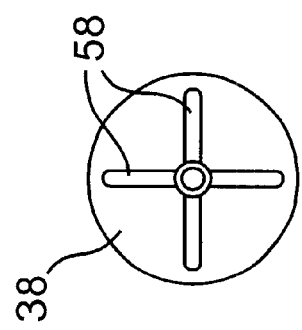
FIG. 5A is a top plan view of the resiliently deformable cushioning structure showing the lubricant distributing grooves thereon.

A resiliently deformable cushioning structure 38 has a second cooperating interlocking structure, generally shown at 40 in FIGS. 5B and 5C, and is mounted to the engine connecting axial end portion 32 of the driveshaft 30 with the first and second cooperating interlocking structures 36, 40 interlocking with one another in a cooperating relationship to secure the cushioning structure 38 on the engine connecting axial end portion 32. The cushioning structure 38 is preferably made of rubber.

The engine connecting axial end portion 32 of the driveshaft 30 with the cushioning structure 38 secured thereon by virtue of the first and second interlocking structures 36, 40 is inserted through the driveshaft receiving opening 18 of the outer casing 16 and into the driveshaft receiving bore 28 of the coupling structure 22 such that the coupling structure 22 couples the output shaft 20 and the driveshaft 30 together so that powered rotation of the output shaft 20 rotates the driveshaft 30 via the coupling structure 22. The driveshaft receiving bore 28 is internally splined and a splined portion 42 of the engine connecting end portion 32 is externally splined with these splines being intermeshed so as to couple the coupling structure 22 with the driveshaft 30. The cushioning structure 38 is positioned between the engine connecting axial end portion 32 and an abuttable structure, generally shown at 44, within the driveshaft receiving bore 28 such that the cushioning structure 38 prevents the engine connecting axial end portion 32 from abutting directly against the abuttable structure 44 during relative movement of the engine 14 and the driveshaft 30 towards one another, as shown in FIG. 2B. The cushioning structure 38 is compressed between the abuttable structure 44 and the engine connecting axial end portion 32 during the relative movement to cushion transmission of forces therebetween.

The abuttable structure 44 shown is the end 24 of the output shaft 20 itself. Alternatively, it is contemplated that the abuttable structure 44 may be a rigid plate-like protective member fixedly secured within the coupling structure 22 at a position intermediate the one end of the output shaft 20 and the cushioning structure 38.

The engine 14 is mounted on a plurality of shock absorbing mounts (not shown) which allow the engine 14 to shift position in order to damp vibrational effects that occur during operation as discussed earlier in the application. The shifting of the engine 14 causes the relative movement of the engine 14 and the driveshaft 30 towards one another.

A propelling structure (not shown) is carried on the hull 12 and disposed in the body of water. The propelling structure is connected to the propelling structure axial end portion 34 of the driveshaft 30 such that the driveshaft 30 and the propelling structure rotate together so that powered rotation of the output shaft 20 rotates the propelling structure via the driveshaft 30 and the coupling structure 22. The propelling structure is constructed and arranged to displace water during rotation thereof so as to propel the watercraft 10 along the surface of the body of water.

The propelling structure is preferably an impeller disposed within a tunnel (which is defined in part by surface 13 in FIG. 2A) formed within the hull 12 that has a discharge opening at the stern of the hull 12 and an intake opening on the underside of the hull 12. Rotation of the impeller draws water into the tunnel via the intake opening and discharges the water in a pressurized stream to propel the watercraft 10 along the surface of the body of water. Alternatively, the propelling structure may be a propeller mounted outboard of the hull 12 at the stern thereof.

The propelling structure has an internally splined bore therein to receive a splined portion 48 of the propelling structure end portion 34 so as to connect the propelling structure with the driveshaft 30. The driveshaft 30 includes a second resiliently deformable cushioning structure 46 mounted with a friction fit on the propelling structure end portion 34 to cushion movement of the propelling structure end portion 34 within the propelling structure's splined bore. The second resiliently deformable cushioning structure 46 comprises a head portion 50 and an elongated portion 52 extending axial therefrom. The propelling structure end portion 34 includes a hole 54 which receives the elongated portion 52 therein with a friction-fit.

The outer casing 16 of the engine 14 has a supply of lubricant contained therein. Specifically, the outer casing 16 has a pan that forms a reservoir for lubricant at the bottom of the engine 14. The output shaft 20 has structure defining a fluid path 56 communicating the supply of lubricant to the driveshaft receiving bore 28 such that during generation of the power, pressure within the casing 16 forces the lubricant along the fluid path 56 to the driveshaft receiving bore 28 of the coupling structure 22. In the illustrated embodiment, the fluid path 56 is provided by a single bore extending internally along the axis of the output shaft 20. It should be noted that the supply of lubricant does not need to come from within the outer casing 16. The supply of lubricant may be provided from a source, such as a tank, outside the outer casing 16 of the engine 14 and communicated to the driveshaft receiving bore 28.

The cushioning structure 38 has one or more generally radially extending lubricant distributing grooves 58 formed thereon. The one or more generally radially extending lubricant distributing grooves 58 are positioned in communication with the fluid path 56 so that the lubricant forced into the driveshaft receiving bore 28 flows into the one or more lubricant distributing grooves 58. Each of the one or more lubricant distributing grooves 58 is configured to distribute the lubricant radially within the driveshaft receiving bore 28 by centrifugal force during the rotation of the driveshaft 30 and the output shaft 20. It is contemplated that the engine connecting axial end portion 32 would have one or more generally radially extending lubricant distributing grooves 58 formed thereon to distribute the lubricant if the cushioning structure 38 is not provided.

In the illustrated embodiment, the cushioning structure 38 has four evenly spaced radially extending grooves 58. It is contemplated that any number of grooves 58 may be formed thereon to distribute the lubricant.

Figure 3B:
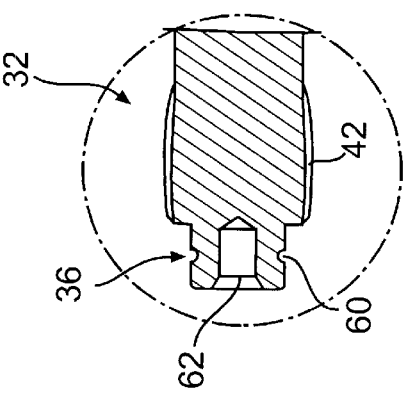
FIG. 3B is an isolated cross-sectional view showing the engine connecting axial end portion.

In the illustrated embodiment, the first cooperating interlocking structure 36 of the driveshaft 30 includes a channel 60 extending around the periphery thereof. Also, the driveshaft 30 has a hole 62 extending axially therein (FIG. 3B). The cushioning structure 38 includes a ring-shaped recessed portion 64 that defines a boss 66 and an annular outer wall 67 (FIG. 5C). The wall 67 has a raised annular portion 68 on an inner periphery thereof which constitutes the second cooperating interlocking structure 40. To install the cushioning structure 38 on the driveshaft 30, the boss 66 is aligned with the hole 62 and moved therein until the raised portion 68 is received within the channel 60 in a detent-type interlocking manner, thereby securing the cushioning structure 38 to the driveshaft 30.

A flexible bellow 76, received between an interior tubular portion 80 affixed to the hull 12 and a fixed structure 82 made of carbon defines a space 84 therebetween around the driveshaft 30.

A pair of sealing sleeves 86, 88 are mounted in spaced relation from one another about the driveshaft 30 for rotation along with the driveshaft 30. Sleeve 86 has a recessed shoulder 90 and a pair of internally grooved portions 92, 94 on an inner peripheral surface. The driveshaft 30 has a groove 96 which aligns with the recessed shoulder 90 and a C-shaped clip 98 is wedged therebetween. O-shaped rings 100, 102 are received within the grooved portions 92, 94 to provide a seal on the inner surface. Sleeve 86 includes a flanged portion 104 that abuts in sealing relation with the fixed structure 82 to prevent water from entering the outer casing 16. The sealing structure 86 is preferably made of steel so as to not significantly wear during frictional contact with the fixed structure 82.

Sleeve 88 has a recessed shoulder 106 on an inner peripheral surface. The driveshaft 30 has grooves 108, 110, 112 which groove 108 aligns with the recessed shoulder 106 and a C-shaped clip 114 is wedged therebetween. O-shaped rings 116, 118 are received within the grooves 110, 112 to provide a seal on the inner surface. A ball bearing 120 and a seal 122 are mounted on an exterior surface of the sleeve 88 thereof A rubber bellow 70 extends outwardly from the driveshaft receiving opening 18 of the outer casing 16 to define a space 74 therebetween in which the driveshaft 30 is received. A sleeve 78 is mounted on the bearing 120 and seal 122 so when the driveshaft is received within the space 74, the sleeve 78 is positioned just within the bellow 70. The bellow 70 is clamped by clamps 71, 73 thereby sealing the space 74 and securing the components mounted on the driveshaft therebetween. Thus, the supply of lubricant is prevented from leaving beyond the space 74. The bearing 120 supports the driveshaft 30 in the space 74 of the hull 12 for rotational movement.

C-shaped clip 98 locks sleeve 86 in place by preventing longitudinal movement of sleeve 86 toward sleeve 88. Sleeve 86 is prevented from longitudinal movement toward hull 12 because it abuts fixed structure 82. Similarly, C-shaped clip 114 locks sleeve 88 in place by preventing longitudinal movement of sleeve 88 toward sleeve 86. Sleeve 88 is held in place on driveshaft 30, inter alia, by bellow 70.

Figure 4:
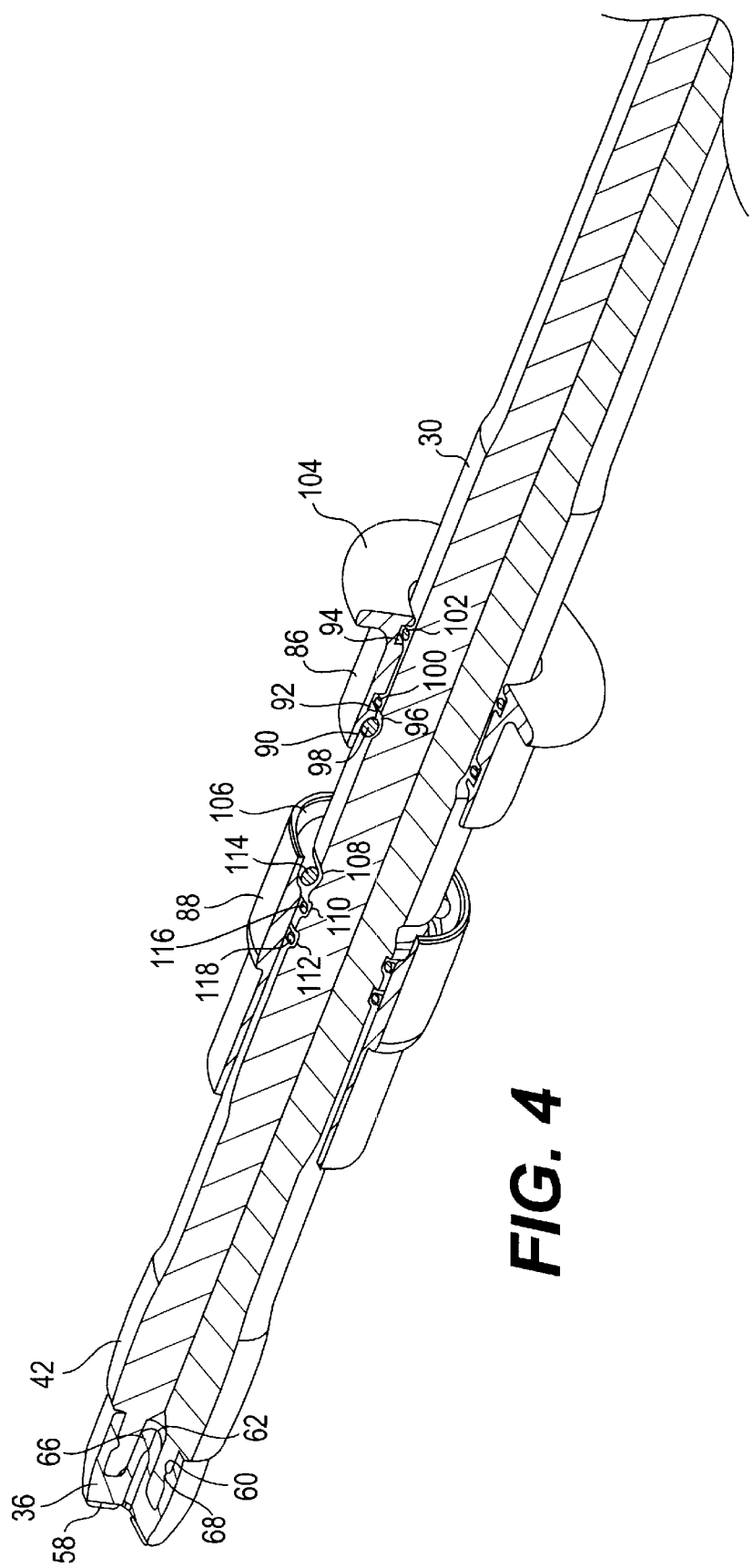
FIG. 4 is a partial cross-sectional view showing a resiliently deformable cushioning structure constructed in accordance with the principles of the present invention on mounted to the driveshaft.
Figure 6A:
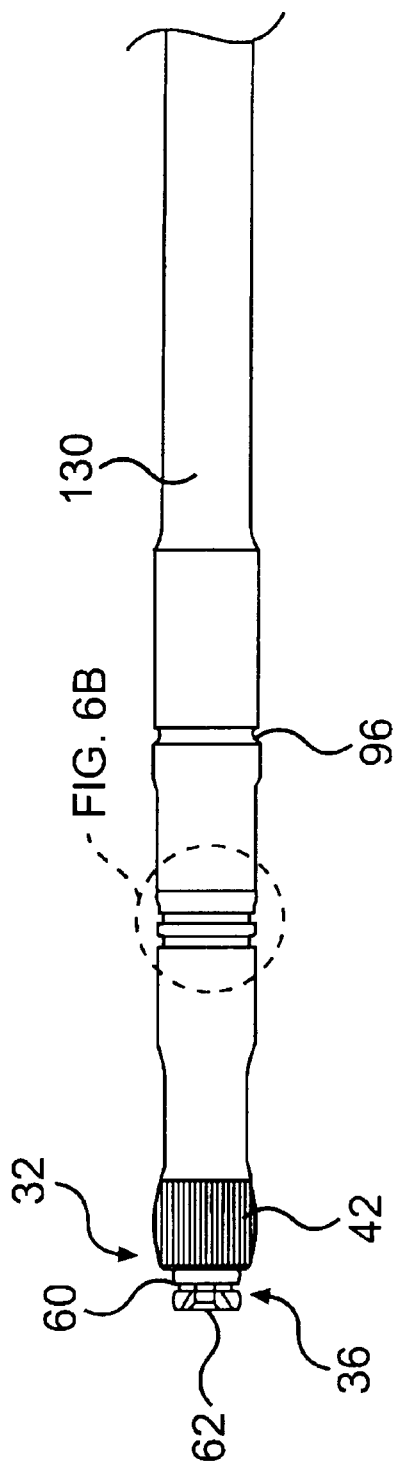
FIG. 6A is a side view of a further embodiment of the driveshaft.
Figure 6B:
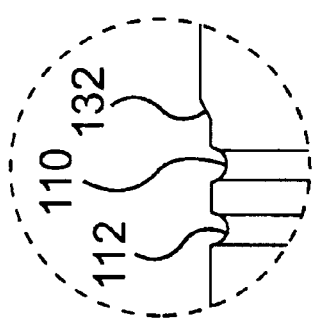
FIG. 6B is an enlarged side view of a portion of the driveshaft shown in FIG. 6A.
Figure 8:
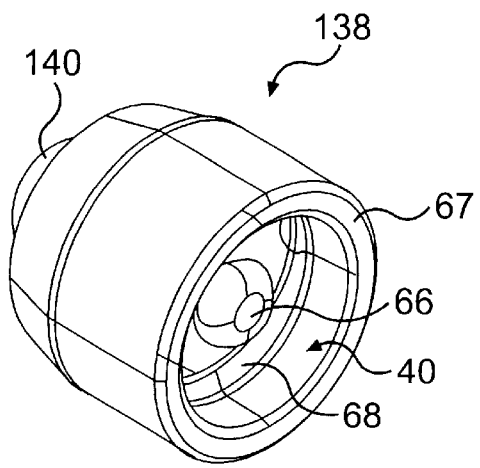
FIG. 8 is a perspective view of a further embodiment of the resiliently deformable cushioning structure.
Figure 9A:
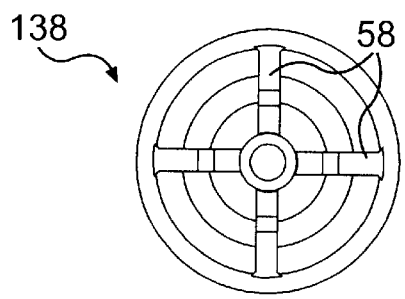
FIG. 9A is a top plan view of the resiliently deformable cushioning structure shown in FIG. 8 illustrating the lubricant distributing grooves thereon.
Figure 9B:
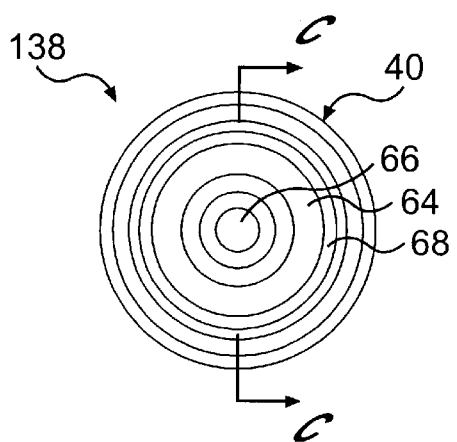
FIG. 9B is a bottom view of the resiliently deformable cushioning structure show FIG. 8.
Figure 9C:
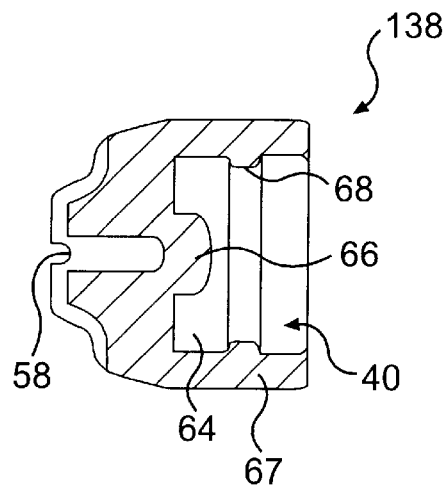
FIG. 9C is a cross-sectional view of the resiliently deformable cushioning structure shown in FIG. 8.

A further embodiment of the driveshaft, indicated as 130, is illustrated in FIGS. 6A and 6B. In this embodiment, the driveshaft 130 has a shoulder 132, in place of the groove 108 shown in FIG. 3A. The remaining elements of the driveshaft 130 are the same as the elements of driveshaft 30 shown in FIG. 3A and are indicated with the same reference numeral. Because the driveshaft 130 has a shoulder 132, the C-shaped clip 114 of FIG. 4 is no longer required to prevent longitudinal movement of sleeve 88 toward sleeve 86. The sleeve 88 would be mounted on the driveshaft 130 such that the recessed shoulder 88 abuts the shoulder 132.

It is also contemplated that the sleeve 88 may not be provided. As shown in FIG. 7, the bearing 120 is mounted directly to the driveshaft 130. Specifically, the bearing 120 has a tapered end 121 that abuts the shoulder 132 to prevent longitudinal movement of the bearing 120 toward the sleeve 86. The bellow 70 secures the bearing 120 mounted on the driveshaft 130 therebetween.

Figure 10:
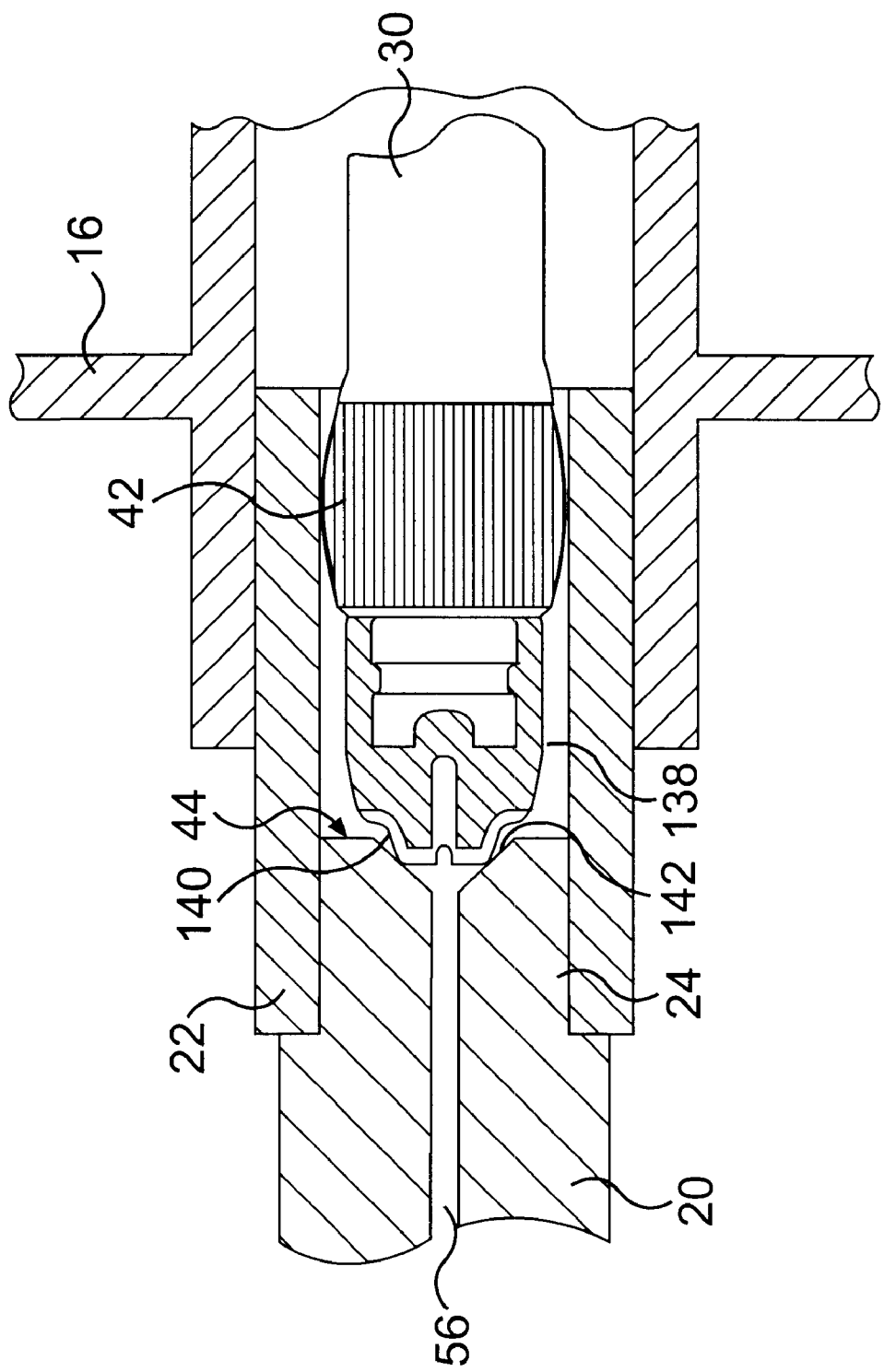
FIG. 10 is a cross-sectional view showing the driveshaft, with the cushioning structure shown in FIG. 8 secured thereon, coupled with the output shaft of the engine.

A further embodiment of the cushioning structure, indicated as 138, is illustrated in FIGS. 8 and 9A–9C. In this embodiment, the cushioning structure 138 has a tapered end 140. The end 140 is tapered such that it can be received within the end 24 of the output shaft 20, which is the abuttable structure 44. Specifically, the output shaft 20, as a result of the manufacturing process, has a centered end 142 or an end with an axially extending recess. The tapered end 140 of the cushioning structure 138 fits within the centered end 142 of the output shaft 20 when the output shaft 20 and the driveshaft 30 are coupled within the coupling structure 22, as shown in FIG. 10. This arrangement facilitates distribution of the lubricant by the lubricant distributing grooves 58 of the cushioning structure 138.

It can thus be appreciated that the objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the spirit and scope of the appended claims.

What is claimed:

1. A watercraft for travelling along a surface of a body of water, said watercraft comprising:

a hull for buoyantly supporting said watercraft on the surface of the body of water;

an engine carried by said hull, said engine comprising an outer casing, a rotatable output shaft, and a coupling structure provided on an abuttable end of said output shaft for rotation therewith, said coupling structure having a driveshaft receiving bore;

a driveshaft having an engine connecting axial end portion and a propelling structure connecting axial end portion, said engine connecting end portion providing a first cooperating interlocking structure;

a resiliently deformable cushioning structure having a second cooperating interlocking structure and being mounted to said engine connecting axial end portion of said driveshaft, said first and second cooperating interlocking structures interlocking with one another in a cooperating relationship to secure said cushioning structure on said engine connecting axial end portion;

said engine connecting axial end portion of said driveshaft with said cushioning structure secured thereon being inserted into said driveshaft receiving bore of said coupling structure such that (a) said coupling structure couples said output shaft and said drive shaft together so that powered rotation of said output shaft is transmitted to said driveshaft and (b) said cushioning structure is positioned between said engine connecting axial end portion of said driveshaft and said abuttable end of said output shaft such that said cushioning structure prevents said engine connecting axial end portion from abutting directly against said abuttable end of said output shaft during relative movement of said driveshaft and said output shaft towards one another; and a propelling structure operatively connected to said propelling structure axial end portion of said driveshaft such that powered rotation of said output shaft rotates said propelling structure via said driveshaft, said propelling structure being constructed and arranged to displace water during rotation thereof so as to propel said watercraft along the surface of the body of water.

2. A watercraft according to claim 1, wherein said outer casing has a driveshaft receiving opening and wherein said coupling structure is disposed within said casing adjacent said driveshaft receiving opening such that said driveshaft receiving bore is generally coaxially aligned with said driveshaft receiving opening, said engine connecting axial end portion of said driveshaft with said cushioning structure secured thereon being inserted through said driveshaft receiving opening of said outer casing and into said driveshaft receiving bore of said coupling structure to couple said output shaft and said driveshaft together.

3. A watercraft according to claim 2, wherein said engine is an internal combustion engine that includes one or more cylinders and one or more reciprocating pistons received within said one or more cylinders, said one or more pistons being connected to said output shaft to affect rotary motion thereof.

4. A watercraft according to claim 2, wherein said coupling structure includes an output shaft receiving bore in coaxial relation with said driveshaft receiving bore, said output shaft receiving bore having threads thereon to threadably engage a threaded portion of said abuttable end of said output shaft so as to couple said coupling structure with said output shaft.

5. A watercraft according to claim 2, wherein said driveshaft receiving bore is internally splined to receive a splined portion of said engine connecting end portion so as to couple said coupling structure with said driveshaft.

6. A watercraft according to claim 2, wherein said engine connecting axial end portion has a periphery and said first cooperating interlocking structure includes a channel extending around the periphery and a hole extending axially therein;

wherein said cushioning structure includes a ring-shaped recessed portion that defines a boss and an annular outer wall, said outer wall having a raised portion on an inner periphery thereof which constitutes said second cooperating interlocking structure; and wherein said boss of said second cooperating interlocking structure is aligned with said hole of said first cooperating interlocking structure and moved therein until said raised portion is received within said channel thereby interlocking said first and second cooperating interlocking structures.

7. A watercraft according to claim 2, wherein said cushioning structure has a tapered end, said tapered end being received within an axially extending recess provided on the abuttable end of said output shaft when said driveshaft is coupled to said output shaft within said coupling structure.

8. A watercraft for travelling along a surface of a body of water, said watercraft comprising;

a hull for buoyantly supporting said watercraft on the surface of the body of water;

an engine carried by said hull, said engine comprising an outer casing, a supply of lubricant, a rotatable output shaft, and a coupling structure provided on an abuttable end of said output shaft for rotation therewith, said coupling structure having a driveshaft receiving bore, and said output shaft having structure defining a fluid path communicating said supply of lubricant to said driveshaft receiving bore such that, during generation of power, said lubricant flows along said fluid path to said driveshaft receiving bore of said coupling structure;

a driveshaft having an engine connecting axial end portion and a propelling structure connecting axial end portion, said engine connecting axial end portion having one or more lubricant distributing grooves formed thereon;

said engine connecting axial end portion of said driveshaft being inserted into said driveshaft receiving bore of said coupling structure such that (a) said coupling structure couples said output shaft and said drive shaft together so that powered rotation of said output shaft is transmitted to said driveshaft and (b) said one or more lubricant distributing grooves are positioned in communication with said fluid path so that said lubricant flowing into said driveshaft receiving bore flows into said one or more lubricant distributing grooves, each of said one or more lubricant distributing grooves being configured to distribute said lubricant within said driveshaft receiving bore during the rotation of said driveshaft and said output shaft; and a propelling structure connected to said propelling structure axial end portion of said driveshaft such that powered rotation of said output shaft rotates said propelling structure via said driveshaft, said propelling structure being constructed and arranged to displace water during rotation thereof so as to propel said watercraft along the surface of the body of water.

9. A watercraft according to claim 8, wherein each of said one or more lubricant distributing grooves are configured to distribute said lubricant radially within said driveshaft receiving bore by centrifugal force during the rotation of said driveshaft and said output shaft.

10. A watercraft for travelling along a surface of a body of water, said watercraft comprising:

a hull for buoyantly supporting said watercraft on the surface of the body of water;

an engine carried by said hull, said engine comprising an outer casing, a supply of lubricant, a rotatable output shaft, and a coupling structure provided on an abuttable end of said output shaft for rotation therewith, said coupling structure having a driveshaft receiving bore, and said output shaft having structure defining a fluid path communicating said supply of lubricant to said driveshaft receiving bore such that, during generation of power, said lubricant flows along said fluid path to said driveshaft receiving bore of said coupling structure;

a driveshaft having an engine connecting axial end portion and a propelling structure connecting axial end portion;

a resiliently deformable cushioning structure secured to said engine connecting axial end portion, said cushioning structure having one or more lubricant distributing grooves formed thereon;

said engine connecting axial end portion of said driveshaft with said cushioning structure secured thereon being inserted into said driveshaft receiving bore of said coupling structure such that (a) said coupling structure couples said output shaft and said drive shaft together so that powered rotation of said output shaft is transmitted to said driveshaft and (b) said one or more lubricant distributing grooves of said cushioning structure are positioned in communication with said fluid path so that said lubricant flowing into said driveshaft receiving bore flows into said one or more lubricant distributing grooves, each of said one or more lubricant distributing grooves being configured to distribute said lubricant within said driveshaft receiving bore during the rotation of said driveshaft and said output shaft; and a propelling structure connected to said propelling structure axial end portion of said driveshaft such that powered rotation of said output shaft rotates said propelling structure via said driveshaft, said propelling structure being constructed and arranged to displace water during rotation thereof so as to propel said watercraft along the surface of the body of water.

11. A watercraft according to claim 10, wherein each of said one or more lubricant distributing grooves are configured to distribute said lubricant radially within said driveshaft receiving bore by centrifugal force during the rotation of said driveshaft and said output shaft.

12. A watercraft according to claim 10, further comprising:

a first cooperating interlocking structure on said engine connecting end portion of said driveshaft;

said cushioning structure having a second cooperating interlocking structure and being mounted to said engine connecting axial end portion of said driveshaft with said first and second cooperating interlocking structures interlocking with one another in a cooperating relationship to secure said cushioning structure on said engine connecting axial end portion;

said engine connecting axial end portion of said driveshaft with said cushioning structure secured thereon being inserted into said driveshaft receiving bore of said coupling structure such that said cushioning structure is positioned between said engine connecting axial end portion and an abuttable end of said output shaft within said driveshaft receiving bore such that said cushioning structure prevents said engine connecting axial end portion from abutting directly against said abuttable end of said output shaft during relative movement of said engine and said driveshaft towards one another.

13. A watercraft according to claim 12, wherein said engine is an internal combustion engine that includes one or more cylinders and one or more reciprocating pistons received within said one or more cylinders, said one or more pistons being connected to said output shaft to affect rotary motion thereof.

14. A watercraft according to claim 12, wherein said coupling structure includes an output shaft receiving bore in coaxial relation with said driveshaft receiving bore, said output shaft receiving bore having threads thereon to threadably engage a threaded portion of said abuttable end of said output shaft so as to couple said coupling structure with said output shaft.

15. A watercraft according to claim 12, wherein said driveshaft receiving bore is internally splined to receive a splined portion of said engine connecting end portion so as to couple said coupling structure with said driveshaft.

16. A watercraft according to claim 12, wherein said engine connecting axial end portion has a periphery and said first cooperating interlocking structure includes a channel extending around the periphery and a hole extending axially therein;

wherein said cushioning structure includes a ring-shaped recessed portion that defines a boss and an annular outer wall, said outer wall having a raised portion on an inner periphery thereof which constitutes said second cooperating interlocking structure; and wherein said boss of said second cooperating interlocking structure being aligned with said hole of said first cooperating interlocking structure and moved therein until said raised portion is received within said channel thereby interlocking said first and second cooperating interlocking structures.

17. A watercraft according to claim 12, wherein said cushioning structure has a tapered end, said tapered end being received within an axially extending recess provided on the abuttable end of said output shaft when said driveshaft is coupled to said output shaft within said coupling structure.

18. A driveshaft assembly for use in a vehicle having an engine with an output shaft, said driveshaft assembly comprising:

a driveshaft having an engine connecting axial end portion, said engine connecting end portion providing a first cooperating interlocking structure;

a resiliently deformable cushioning structure having a second cooperating interlocking structure and being mounted to said engine connecting axial end portion of said driveshaft wherein said cushioning structure is an end cap and said first and second cooperating interlocking structures interlock with one another in a cooperating relationship to secure said cushioning structure on said engine connecting axial end portion, wherein said end cap is adapted to abut an end of said output shaft; and wherein said driveshaft also has a propelling structure connecting axial end portion, said propelling structure axial end portion being adapted to be operatively connected to a propelling structure such that powered rotation of said output shaft rotates said propelling structure via said driveshaft.

19. A driveshaft assembly according to claim 18, wherein said engine connecting axial end portion has a periphery and said first cooperating interlocking structure includes a channel extending around the periphery and a hole extending axially therein;

wherein said cushioning structure includes a ring-shaped recessed portion that defines a boss and an annular outer wall, said outer wall having a raised portion on an inner periphery thereof which constitutes said second cooperating interlocking structure; and wherein said boss of said second cooperating interlocking structure is aligned with said hole of said first cooperating interlocking structure and moved therein until said raised portion is received within said channel thereby interlocking said first and second cooperating interlocking structures.

20. A driveshaft assembly according to claim 18, wherein said output shaft has structure defining a fluid path communicating a supply of lubricant contained within the engine, wherein said cushioning structure has one or more generally radially extending lubricant distributing grooves formed thereon, said one or more generally radially extending lubricant distributing grooves are positioned in communication with said fluid path so that said lubricant flows into said one or more lubricant distributing grooves, each of said one or more lubricant distributing grooves being configured to distribute said lubricant radially by centrifugal force during the rotation of said driveshaft and said output shaft.

21. A driveshaft assembly according to claim 18, wherein said cushioning structure has a tapered end, said tapered end being received within an axially extending recess provided on an abuttable end of said output shaft when said driveshaft is coupled to said output shaft.

22. A driveshaft assembly according to claim 18, wherein said vehicle is a watercraft.

23. A driveshaft for use in a vehicle having an engine with an output shaft, the output shaft having structure defining a fluid path communicating a supply of lubricant contained within the engine, said driveshaft comprising:

an engine connecting axial end portion having one or more generally radially extending lubricant distributing grooves formed thereon;

said engine connecting axial end portion of said driveshaft being adapted to be coupled with said output shaft so that powered rotation of said output shaft is transmitted to said driveshaft and said one or more generally radially extending lubricant distributing grooves are positioned in communication with said fluid path so that said lubricant flows into said one or more lubricant distributing grooves, each of said one or more lubricant distributing grooves being configured to distribute said lubricant radially by centrifugal force during the rotation of said driveshaft and said output shaft; and a propelling structure connecting axial end portion, said propelling structure axial end portion being adapted to be operatively connected to a propelling structure such that powered rotation of said output shaft rotates said propelling structure via said driveshaft.

24. A driveshaft according to claim 23, further comprising:

a first cooperating interlocking structure on said engine connecting end portion;

a resiliently deformable cushioning structure having a second cooperating interlocking structure and being mounted to said engine connecting axial end portion of said driveshaft with said first and second cooperating interlocking structures interlocking with one another in a cooperating relationship to secure said cushioning structure on said engine connecting axial end portion; and said one or more generally radially extending lubricant distributing grooves being formed on said cushioning structure to distribute said lubricant radially by centrifugal force during rotation of said driveshaft and said output shaft.

25. A driveshaft according to claim 24, wherein said engine connecting axial end portion has a periphery and said first cooperating interlocking structure includes a channel extending around the periphery and a hole extending axially therein;

wherein said cushioning structure includes a ring-shaped recessed portion that defines a boss and an annular outer wall, said outer wall having a raised portion on an inner periphery thereof which constitutes said second cooperating interlocking structure; and wherein said boss of said second cooperating interlocking structure is aligned with said hole of said first cooperating interlocking structure and moved therein until said raised portion is received within said channel thereby interlocking said first and second cooperating interlocking structures.

26. A driveshaft according to claim 24, wherein said output shaft has an abuttable end with an axially extending recess, and wherein said cushioning structure has a tapered end, said tapered end being received within the axially extending recess provided on the abuttable end of said output shaft when said driveshaft is coupled to said output shaft.

27. A driveshaft according to claim 23, wherein said vehicle is a watercraft.

28. A driveshaft assembly for a vehicle, comprising:

a driveshaft having an end portion with a first interlocking structure;

a cushioning member having a second interlocking structure, wherein the second interlocking structure connects with the first interlocking structure to form a detent type interlock that axially fixes the cushioning member on the end portion of the driveshaft; and an engine having an output shaft with an end, wherein the output shaft has an abuttable structure on the end, and wherein the cushioning member abuts the abuttable structure and forms a cushion between the end portion of the driveshaft and the end of the output shaft.

29. The driveshaft assembly of claim 28, wherein the end portion of the driveshaft has a hole formed therein and the cushioning member has a boss that is received in the hole.

30. The driveshaft assembly of claim 28, wherein the end portion of the driveshaft has a recessed portion and the cushioning member has a raised portion that snap-fits with the recessed portion.

31. The driveshaft assembly of claim 28, wherein the cushioning member has lubrication distributing grooves formed therein.

32. The driveshaft assembly of claim 18, wherein the first and second cooperating interlocking structures form a detent type interlock.

33. The driveshaft assembly of claim 28, further comprising a coupling structure that connects the output shaft to the driveshaft, wherein the cushioning member is disposed within the coupling structure.

34. The driveshaft assembly of claim 28, in combination with a vehicle.

35. The driveshaft assembly of claim 28, in combination with a watercraft.

36. The driveshaft assembly of claim 28, in combination with an engine.

* * * * *